(12) United States Patent
Maalouf

(10) Patent No.: US 11,506,071 B2
(45) Date of Patent: Nov. 22, 2022

(54) PISTON RING SHUTTLE CARRIER

(71) Applicant: Raytheon Technologies Corporation, Farmington, CT (US)

(72) Inventor: Fadi S. Maalouf, East Hampton, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/189,487

(22) Filed: Mar. 2, 2021

(65) Prior Publication Data

US 2022/0282631 A1 Sep. 8, 2022

(51) Int. Cl.
*F01D 11/00* (2006.01)
*F01D 5/02* (2006.01)

(52) U.S. Cl.
CPC ............ *F01D 11/003* (2013.01); *F01D 5/025* (2013.01); *F01D 11/005* (2013.01); *F05D 2220/32* (2013.01); *F05D 2240/55* (2013.01)

(58) Field of Classification Search
CPC .......... F01D 5/025; F01D 5/026; F01D 5/066; F01D 11/003; F01D 11/005; F16J 15/441; F16J 15/442; F16J 15/3272; F05D 2240/58; F05D 2240/581
See application file for complete search history.

(56) References Cited

U.S. PATENT DOCUMENTS

| | | | | |
|---|---|---|---|---|
| 2,883,212 A | * | 4/1959 | Laser ................... | F16J 15/441 277/410 |
| 3,001,806 A | * | 9/1961 | Macks ................. | F16J 15/441 415/230 |
| 4,211,424 A | * | 7/1980 | Stein ..................... | F16J 15/54 277/400 |
| 4,526,387 A | * | 7/1985 | Flower ................. | F01D 11/00 277/422 |
| 4,750,746 A | * | 6/1988 | Boudot ................ | F16J 15/184 415/230 |

(Continued)

FOREIGN PATENT DOCUMENTS

DE 29510961 U1 9/1995

OTHER PUBLICATIONS

Extended European Search Report for Application No. 22159678.6, dated Aug. 2, 2022.

*Primary Examiner* — Richard A Edgar
*Assistant Examiner* — Behnoush Haghighian
(74) *Attorney, Agent, or Firm* — Cantor Colburn LLP

(57) ABSTRACT

A rotating assembly of a gas turbine engine includes a first rotating component; and a second rotating component located radially outboard of the first rotating component, relative to an engine central longitudinal axis. A seal assembly is configured to seal between the first rotating component and the second rotating component. The seal assembly includes a shuttle located on a radial outer surface of the second component and freely axially movable along the radial outer surface and a piston ring seal retained in the shuttle and engaged with the first rotating component. Axial motion of the first rotating component relative to the second rotating component urges movement of the shuttle along the radial outer surface of the second rotating component, while the position of the piston ring seal remains stationary relative to the first rotating component.

15 Claims, 4 Drawing Sheets

(56) References Cited

U.S. PATENT DOCUMENTS

| | | | | |
|---|---|---|---|---|
| 5,292,138 | A * | 3/1994 | Glynn | F16J 15/164 415/230 |
| 6,431,550 | B1 * | 8/2002 | Tong | F16J 15/442 277/346 |
| 7,291,947 | B2 * | 11/2007 | Hashiba | H02K 5/124 310/90 |
| 8,205,891 | B2 * | 6/2012 | Vasagar | F16J 15/441 277/579 |
| 8,408,555 | B2 * | 4/2013 | Garrison | F01D 11/00 277/306 |
| 8,444,153 | B2 | 5/2013 | Gaebler et al. | |
| 8,684,696 | B2 * | 4/2014 | Ress, Jr. | F01D 5/066 416/198 A |
| 8,888,104 | B2 * | 11/2014 | Garrison | F16J 9/24 277/306 |
| 8,899,593 | B2 | 12/2014 | Jahn et al. | |
| 8,932,022 | B2 * | 1/2015 | Ivakitch | F01D 5/025 416/204 R |
| 9,004,495 | B2 * | 4/2015 | Vasagar | F16J 15/441 277/579 |
| 9,850,770 | B2 * | 12/2017 | Garrison | F16J 15/442 |
| 10,190,429 | B2 * | 1/2019 | Garrison | F01D 11/003 |
| 10,208,613 | B2 * | 2/2019 | Davis | F01D 25/246 |
| 10,520,096 | B2 * | 12/2019 | Munson | F16J 15/4476 |
| 10,711,630 | B2 * | 7/2020 | Waldman | F01D 11/003 |
| 10,895,323 | B2 * | 1/2021 | Hirano | F16J 15/40 |
| 10,920,617 | B2 * | 2/2021 | Stoyanov | F01D 11/005 |
| 10,935,142 | B2 * | 3/2021 | Bernacchi | F16J 15/441 |
| 10,948,014 | B2 * | 3/2021 | Garrison | F16J 15/442 |
| 11,162,591 | B2 * | 11/2021 | Martin | H02K 5/124 |
| 2010/0066027 | A1 * | 3/2010 | Vasagar | F16J 15/441 277/350 |
| 2012/0076657 | A1 * | 3/2012 | Ress, Jr. | F01D 5/025 29/700 |
| 2012/0261887 | A1 * | 10/2012 | Vasagar | F16J 15/441 277/543 |
| 2013/0200573 | A1 * | 8/2013 | Garrison | F16J 9/24 137/1 |
| 2017/0314407 | A1 * | 11/2017 | Garrison | F16J 15/442 |
| 2018/0180185 | A1 | 6/2018 | Munson | |
| 2019/0226585 | A1 | 7/2019 | Snow et al. | |
| 2020/0056506 | A1 * | 2/2020 | Stoyanov | F02C 7/28 |

* cited by examiner

PISTON RING SHUTTLE CARRIER

BACKGROUND

Exemplary embodiments of the present disclosure pertain to the art of gas turbine engines, and in particular to sealing or isolating adjacent cavities of a gas turbine engine.

Many seals are utilized in gas turbine engines to isolate various parts of the gas turbine engine. One example of a sealing location is in a high speed rotor of the gas turbine engine, where a piston ring seal is utilized to seal between a rotor tie shaft and a rotor disc, to isolate adjacent cavities. During operation of the gas turbine engine, the tie shaft and the rotor disc experience relative motion, such as relative axial or radial motion, due to operating conditions such as pressure, temperature and centripedal forces. The piston ring seal is a split ring, which cannot support its own centripedal weight and therefore must transfer that force to the rotor disc radially outboard of the piston ring seal. The relative motion causes the piston ring seal to be dragged against these mating parts under significant force causing damaging wear to the piston ring seal and/or to the tie shaft or rotor disc, and deterioration of function of the seal over time.

BRIEF DESCRIPTION

In one embodiment, a rotating assembly of a gas turbine engine includes a first rotating component; and a second rotating component located radially outboard of the first rotating component, relative to an engine central longitudinal axis. A seal assembly is configured to seal between the first rotating component and the second rotating component. The seal assembly includes a shuttle located on a radial outer surface of the second component and freely axially movable along the radial outer surface and a piston ring seal retained in the shuttle and engaged with the first rotating component. Axial motion of the first rotating component relative to the second rotating component urges movement of the shuttle along the radial outer surface of the second rotating component, while the position of the piston ring seal remains stationary relative to the first rotating component.

Additionally or alternatively, in this or other embodiments a first axial stop and a second axial stop are located at the second rotating component between which the shuttle is axially retained.

Additionally or alternatively, in this or other embodiments an axial distance between the first axial stop and the second axial stop is greater than an axial length of the shuttle located therebetween.

Additionally or alternatively, in this or other embodiments the first axial stop is a shoulder formed on the second rotating component, and the second axial stop is a retainer secured to the second rotating component.

Additionally or alternatively, in this or other embodiments the shuttle extends circumferentially unbroken around the second rotating component.

Additionally or alternatively, in this or other embodiments the shuttle is formed from a material having similar thermal properties to the second rotating component.

Additionally or alternatively, in this or other embodiments the piston ring has a split ring configuration.

In another embodiment, a rotor assembly of a gas turbine engine includes a plurality of rotors arranged along an engine central longitudinal axis between a forward rotor hub and an aft rotor hub. A tie shaft is located radially inboard of the plurality of rotors and rotatable therewith about the engine central longitudinal axis. A seal assembly is configured to seal between a rotor of the plurality of rotors and the tie shaft. The seal assembly includes a shuttle located on a radial outer surface of the tie shaft and freely axially movable along the radial outer surface, and a piston ring seal retained in the shuttle and engaged with the rotor. Axial motion of the rotor relative to the tie shaft urges movement of the shuttle along the radial outer surface of the tie shaft, while the position of the piston ring seal remains stationary relative to the rotor.

Additionally or alternatively, in this or other embodiments a first axial stop and a second axial stop are located at the tie shaft between which the shuttle is axially retained.

Additionally or alternatively, in this or other embodiments an axial distance between the first axial stop and the second axial stop is greater than an axial length of the shuttle located therebetween.

Additionally or alternatively, in this or other embodiments the first axial stop is a shoulder formed on the second rotating component, and the second axial stop is a retainer secured to the second rotating component.

Additionally or alternatively, in this or other embodiments the shuttle extends circumferentially unbroken around the second rotating component.

Additionally or alternatively, in this or other embodiments the shuttle is formed from a material having similar thermal properties to the second rotating component.

Additionally or alternatively, in this or other embodiments the piston ring has a split ring configuration.

In yet another embodiment, a gas turbine engine includes a combustor and a rotor assembly operably connected to the combustor. The rotor assembly includes a plurality of rotors arranged along an engine central longitudinal axis between a forward rotor hub and an aft rotor hub, and a tie shaft located radially inboard of the plurality of rotors and rotatable therewith about the engine central longitudinal axis. A seal assembly is configured to seal between a rotor of the plurality of rotors and the ties shaft. The seal assembly includes a shuttle located on a radial outer surface of the tie shaft and freely axially movable along the radial outer surface, and a piston ring seal retained in the shuttle and engaged with the rotor. Axial motion of the rotor relative to the tie shaft urges movement of the shuttle along the radial outer surface of the tie shaft, while the position of the piston ring seal remains stationary relative to the rotor.

Additionally or alternatively, in this or other embodiments a first axial stop and a second axial stop are located at the tie shaft between which the shuttle is axially retained.

Additionally or alternatively, in this or other embodiments an axial distance between the first axial stop and the second axial stop is greater than an axial length of the shuttle located therebetween.

Additionally or alternatively, in this or other embodiments the first axial stop is a shoulder formed on the second rotating component, and the second axial stop is a retainer secured to the second rotating component.

Additionally or alternatively, in this or other embodiments the shuttle extends circumferentially unbroken around the second rotating component.

Additionally or alternatively, in this or other embodiments the piston ring has a split ring configuration.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
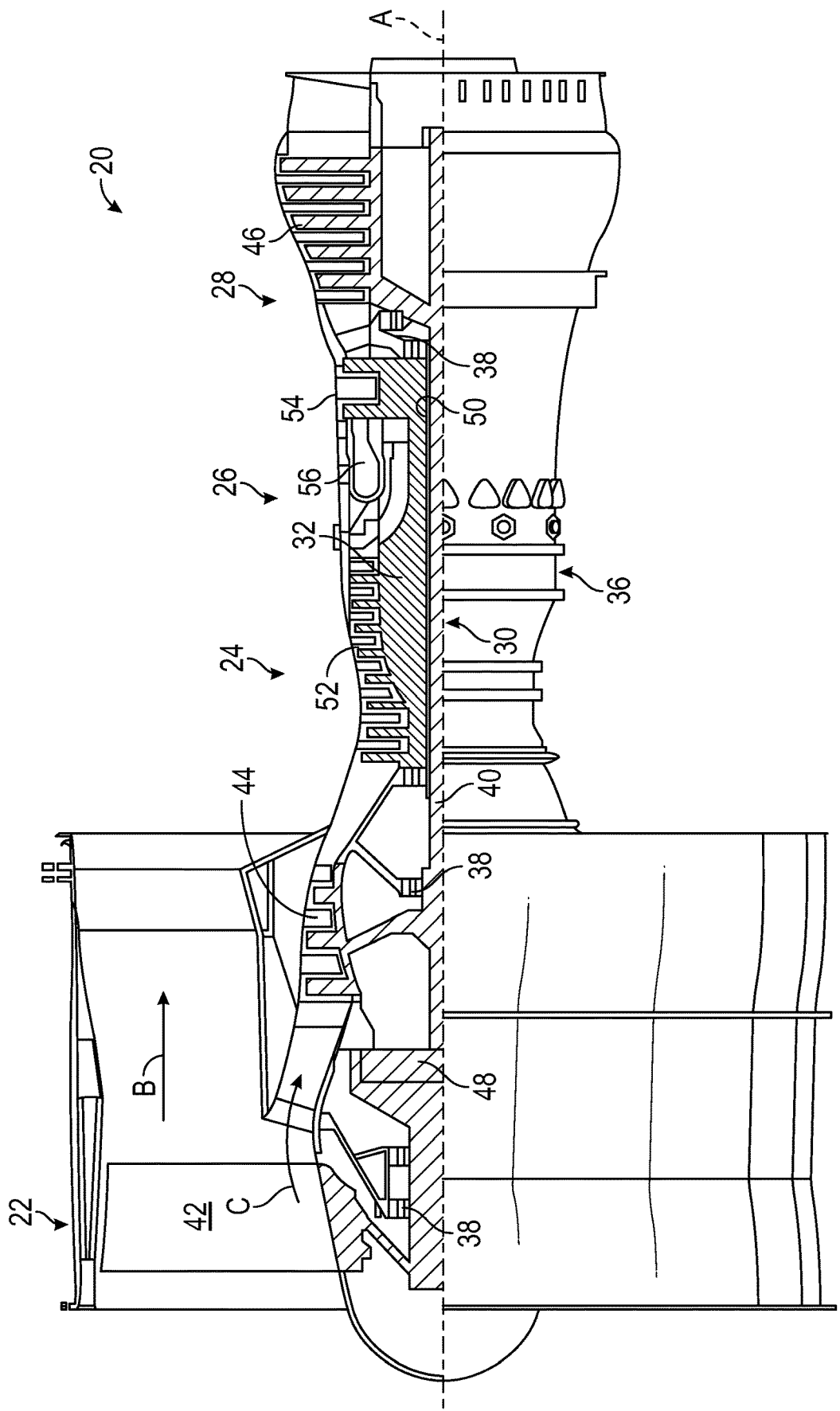
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram~°~R)/(518.7°~R)]^{0.5}$. The "Low corrected fan tip speed" as disclosed herein according to one non-limiting embodiment is less than about 1150 ft/second (350.5 m/sec).

Figure 2:
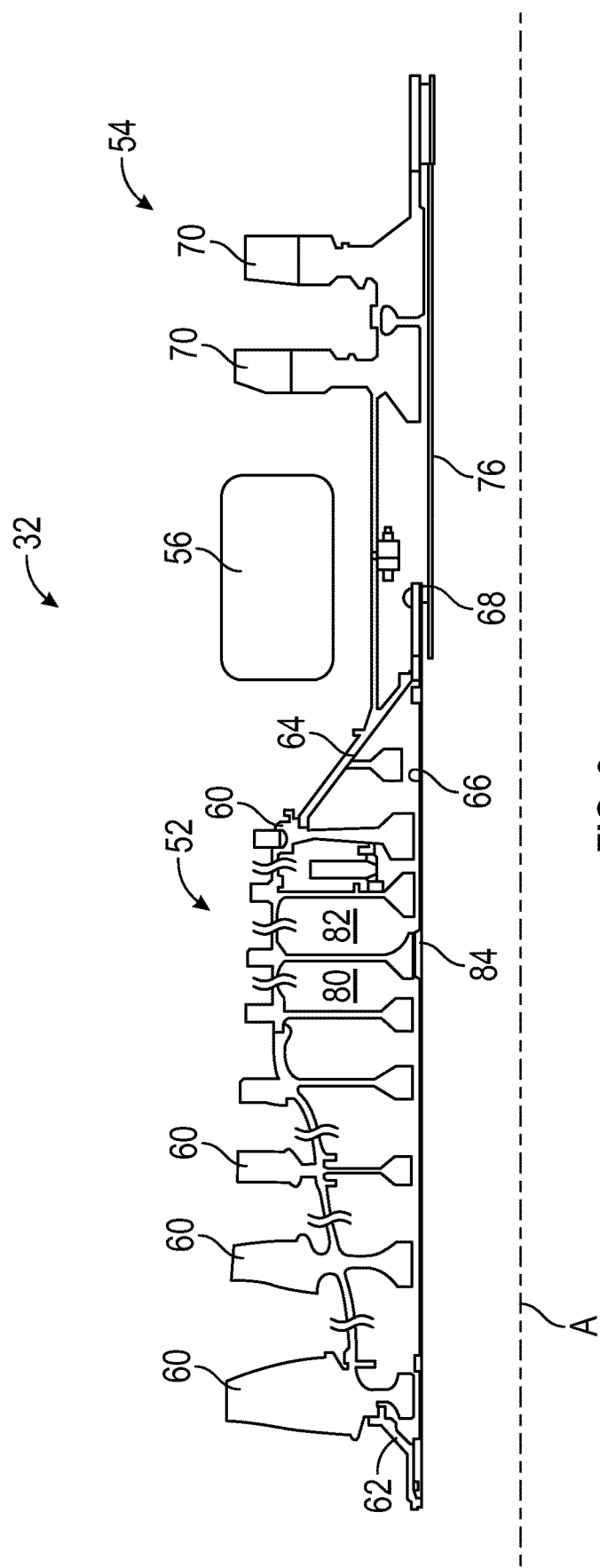
FIG. 2 is a partial view of an embodiment of a high speed spool of a gas turbine engine.

Referring now to FIG. 2, illustrated is a partial view of an embodiment of the high speed spool 32 with the high pressure compressor 52 and the high pressure turbine 54. The high pressure compressor 52 includes a plurality of compressor rotors 60 located between a forward compressor hub 62 and an aft compressor hub 64. A high pressure compressor (HPC) tie shaft 66 extends radially inboard of the compressor rotors 60 and engages the forward compressor hub 62 and the aft compressor hub 64. In some embodiments, a high pressure turbine (HPT) tie shaft 76 extends radially inboard of high pressure turbine rotors 70 of the high pressure turbine 54 and engages the HPC tie shaft 66. A spanner nut 68 engages an axially downstream end of the HPC tie shaft 66 to compress the plurality of compressor rotors 60 between the forward compressor hub 62 and the aft compressor hub 64.

Figure 3:
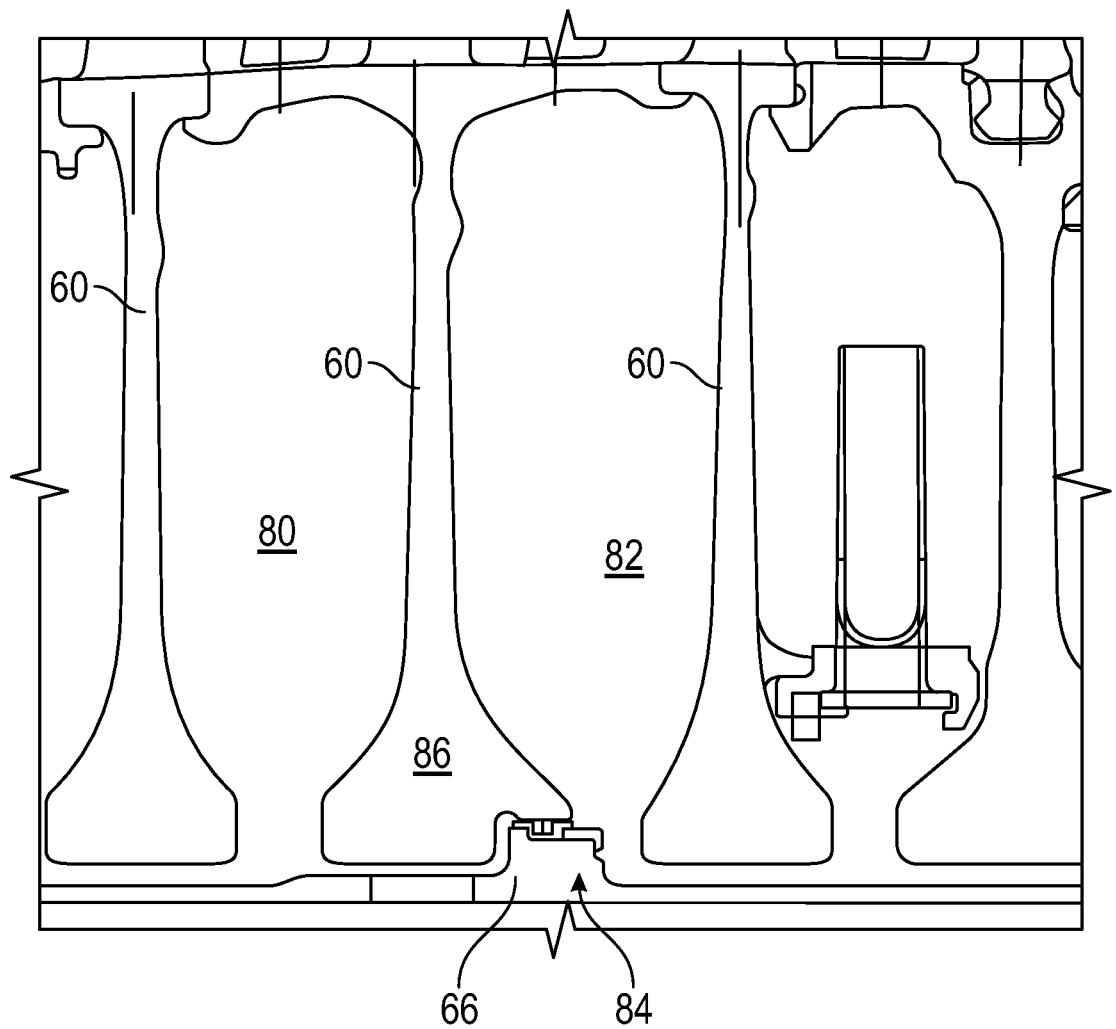
FIG. 3 is another view of an embodiment of a high speed spool including a seal assembly.

The structure defines two or more rotor compartments between the HPC tie shaft 66 and the compressor rotors 60, for example, a first rotor compartment 80 and a second rotor compartment 82. Referring now to FIG. 3, it may be desired to isolate the first rotor compartment 80 from the second rotor compartment 82, and thus a seal assembly 84 is located at a compressor rotor 60, for example, a sixth stage compressor rotor 86 of the compressor rotors 60 and extends between the compressor rotor 60 and the HPC tie shaft 66. While in the embodiment of FIG. 3, the seal assembly 84 is located at the sixth stage compressor rotor 86, one skilled in the art will readily appreciate that the seal assembly 84 may be located at other locations along the HPC tie shaft 66, for example other compressor rotors 60, and that in some embodiments multiple seal assemblies 84 may be utilized.

Figure 4:
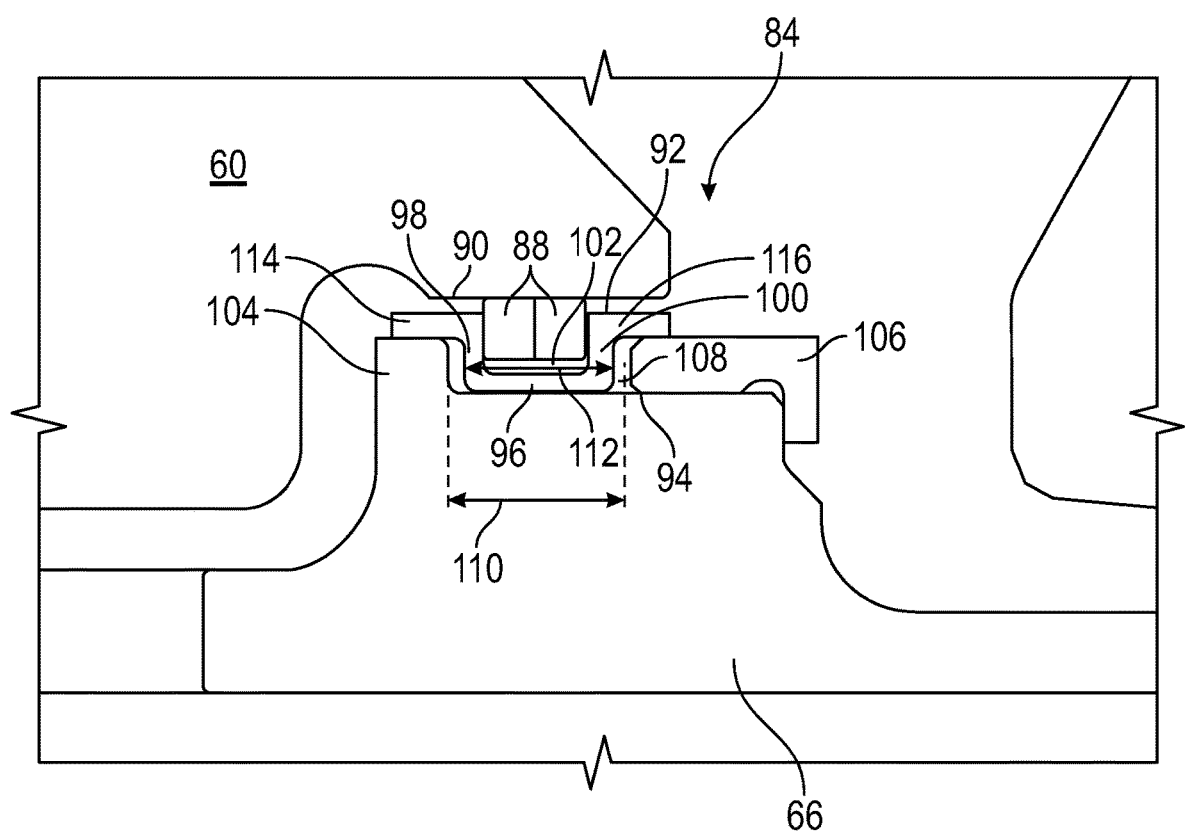
FIG. 4 is a partial cross-sectional view of an embodiment of a seal assembly.

The seal assembly 84 is illustrated in more detail in FIG. 4. As shown, the seal assembly 84 includes a piston ring seal 88 engaging the compressor rotor 60, in some embodiments an inner bore surface 90 of the compressor rotor 60. In some embodiments, two piston ring seals 88 may be utilized. The piston ring seals 88 are circumferentially split rings, and thus a configured to radially "grow" during operation of the gas turbine engine 20 into engagement with the compressor rotor 60.

The piston ring seals 88 reside in a shuttle 92 located at the HPC tie shaft 66. The HPC tie shaft 66 includes a radial shaft surface 94 on which a complementary shuttle base 96 of the shuttle 92 rests. The shuttle 92 further includes a forward axial leg 98 and an aft axial leg 100 extending from the shuttle base 96 and defining a shuttle pocket 102 therebetween. The piston ring seals 88 are at least partially inserted into the shuttle pocket 102. The HPC tie shaft 66 includes a shoulder 104 located at a first end of the shuttle 92, for example axially forward of the shuttle 92, and a retainer 106 installed to the HPC tie shaft 66 at a second end of the shuttle 92, for example axially aft of the shuttle 92. While in some embodiments, such as shown in FIG. 4, the shoulder 104 is located axially forward of the shuttle 92 and the retainer 106 is installed to the HPC tie shaft 66 axially aft of the shuttle 92, in other embodiments the configuration may be substantially mirrored or reversed. In some embodiments, the shoulder 104 may be located axially aft of the shuttle 92 and the retainer 1106 is located axially forward of the shuttle 92. The shoulder 104 and the retainer 106 define a shaft pocket 108 in which the shuttle 92 resides. A shaft pocket axial width 110 is greater than a shuttle width 112 such that the shuttle 92 is axially movable along the radial shaft surface 94 between the shoulder 104 and the retainer 106. In some embodiments, the shuttle 92 includes a forward arm 114 extending axially forward from the forward axial leg 98 at least partially over the shoulder 104, and an aft arm 116 extending axially aft from the axial aft leg 100 at least partially over the retainer 106, to act as a radial locator for the shuttle 92 and a guide during axial movement of the shuttle 92, and to further reduce leakage across the shuttle 92.

The shuttle 92 is a full hoop component extending entirely circumferentially unbroken around the HPC tie shaft 66, and formed from a material with similar thermal properties as the HPC tie shaft 66 such that during operation the shuttle 92 maintains a close clearance to the HPC tie shaft 66 to prevent leakage. The shuttle 92 is axially retained between the shoulder 104 and the retainer 106, and is freely axially movable therebetween. During operation of the gas turbine engine 20, the piston ring seals 88 will establish an equilibrium position relative to the compressor rotor 60 and engage the compressor rotor 60, and the shuttle 92 will likewise be axially positioned by the position of the piston ring seals 88. Based on movement of the HPC tie shaft 66 relative to the compressor rotor 60, however, the actual position of the shuttle 92 between the shoulder 104 and the retainer 106 will vary. As the relative motion of the compressor rotor 60 and the HPC tie shaft 66 changes, the shuttle 92 will move axially between the shoulder 104 and the retainer 106, while the piston ring seals 88 remain engaged in a same position to the compressor rotor 60. Since the piston ring seals 88 remain stationary relative to the compressor rotor 60 to which it is engaged, wear of the piston ring seals 88 and the compressor rotor 60 is greatly reduced, while the seal of the piston ring seals 88 to the compressor rotor 60 is maintained.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotating assembly of a gas turbine engine, comprising:
   a first rotating component;
   a second rotating component disposed radially outboard of the first rotating component, relative to an engine central longitudinal axis; and
   a seal assembly configured to seal between the first rotating component and the second rotating component, the seal assembly including:
      a shuttle disposed on a radial outer surface of the first component and freely axially movable along the radial outer surface; and
      a piston ring seal retained in the shuttle and engaged with the first second rotating component;
      a first axial stop and a second axial stop at the first rotating component between which the shuttle is axially retained
      wherein the shuttle includes:
         a shuttle pocket into which the piston ring is installed and is located axially between the first axial stop and the second axial stop;
         at least one shuttle arm extending axially from the shuttle pocket and axially overlapping at least one of the first axial stop or the second axially stop;
      wherein axial motion of the first second rotating component relative to the first rotating component during operation of the gas turbine engine urges movement of the shuttle along the radial outer surface of the first rotating component, while the position of the piston ring seal remains stationary relative to the second rotating component.

2. The rotating assembly of claim 1, wherein an axial distance between the first axial stop and the second axial stop is greater than an axial length of the shuttle located therebetween.

3. The rotating assembly of claim 1, wherein the first axial stop is a shoulder formed on the first rotating component, and the second axial stop is a retainer secured to the first rotating component.

4. The rotating assembly of claim 1, wherein the shuttle extends circumferentially unbroken around the first rotating component.

5. The rotating assembly of claim 1 wherein the piston ring seal has a split ring configuration.

6. A rotor assembly of a gas turbine engine, comprising:
a plurality of rotors arranged along an engine central longitudinal axis between a forward rotor hub and an aft rotor hub;
a tie shaft located radially inboard of the plurality of rotors and rotatable therewith about the engine central longitudinal axis; and
a seal assembly configured to seal between a rotor of the plurality of rotors and the tie shaft, the seal assembly including:
a shuttle disposed on a radial outer surface of the tie shaft and freely axially movable along the radial outer surface; and
a piston ring seal retained in the shuttle and engaged with the rotor;
a first axial stop and a second axial stop at the tie shaft between which the shuttle is axially retained
wherein the shuttle includes:
a shuttle pocket into which the piston ring is installed and is located axially between the first axial stop and the second axial stop;
at least one shuttle arm extending axially from the shuttle pocket and axially overlapping at least one of the first axial stop or the second axially stop;
wherein axial motion of the rotor relative to the tie shaft during operation of the gas turbine engine urges movement of the shuttle along the radial outer surface of the tie shaft, while the position of the piston ring seal remains stationary relative to the rotor.

7. The rotor assembly of claim 6, wherein an axial distance between the first axial stop and the second axial stop is greater than an axial length of the shuttle located therebetween.

8. The rotor assembly of claim 6, wherein the first axial stop is a shoulder formed on the tie shaft, and the second axial stop is a retainer secured to the tie shaft.

9. The rotor assembly of claim 6, wherein the shuttle extends circumferentially unbroken around the tie shaft.

10. The rotor assembly of claim 6, wherein the piston ring seal has a split ring configuration.

11. A gas turbine engine, comprising:
a combustor; and
a rotor assembly operably connected to the combustor, including:
a plurality of rotors arranged along an engine central longitudinal axis between a forward rotor hub and an aft rotor hub;
a tie shaft located radially inboard of the plurality of rotors and rotatable therewith about the engine central longitudinal axis; and
a seal assembly configured to seal between a rotor of the plurality of rotors and the ties shaft, the seal assembly including:
a shuttle disposed on a radial outer surface of the tie shaft and freely axially movable along the radial outer surface; and
a piston ring seal retained in the shuttle and engaged with the rotor;
a first axial stop and a second axial stop at the tie shaft between which the shuttle is axially retained
wherein the shuttle includes:
a shuttle pocket into which the piston ring is installed and is located axially between the first axial stop and the second axial stop;
at least one shuttle arm extending axially from the shuttle pocket and axially overlapping at least one of the first axial stop or the second axially stop;
wherein axial motion of the rotor relative to the tie shaft urges movement of the shuttle along the radial outer surface of the tie shaft, while the position of the piston ring seal remains stationary relative to the rotor.

12. The gas turbine engine of claim 11, wherein an axial distance between the first axial stop and the second axial stop is greater than an axial length of the shuttle located therebetween.

13. The gas turbine engine of claim 11, wherein the first axial stop is a shoulder formed on the tie shaft, and the second axial stop is a retainer secured to the tie shaft.

14. The gas turbine engine of claim 11, wherein the shuttle extends circumferentially unbroken around the tie shaft.

15. The gas turbine engine of claim 11, wherein the piston ring seal has a split ring configuration.

\* \* \* \* \*